United States Patent [19]

Shreve

[11] 4,438,439

[45] Mar. 20, 1984

[54] SELF-SURVEY MEANS

[75] Inventor: James S. Shreve, Fairfax, Va.

[73] Assignee: The United States of America as represented by the Secretary of the Army, Washington, D.C.

[21] Appl. No.: 258,828

[22] Filed: Apr. 29, 1981

[51] Int. Cl.³ .............................................. G01S 5/06
[52] U.S. Cl. .................................... 343/449; 343/388; 343/398
[58] Field of Search ................... 235/414; 343/112 R, 343/112 C, 112 D, 114.5, 113 PT, 113 R, 106 R, 11 R, 115, 118, 11, 103

[56] References Cited

U.S. PATENT DOCUMENTS 2,971,190 2/1961 Busignies ................... 343/106 R X
3,895,385 7/1975 Alpers ............................ 343/113 R Primary Examiner—S. C. Buczinski
Assistant Examiner—K. R. Kaiser
Attorney, Agent, or Firm—Robert P. Gibson; Anthony T. Lane; Saul Elbaum

[57] ABSTRACT

A method and apparatus for a passive station to locate itself relative to a stationary or moving transmitting station transmitting a narrow pulsed scanning beam by utilizing reception of pulses directly from the transmitting station and reception of reflected pulses from a set of scatterers. A method and means for determining a bearing from the transmitting station and a method and means for determining a range to the transmitting station is disclosed utilizing a set of differential times, the times for a pulse from the transmitting station to travel to each scatterer and then to the passive station, a set of angles lying between a line connecting the transmitting station and passive station and a set of lines connecting the transmitting station and the set of scatterers and a set of angles lying between a link connecting the passive station and the transmitting station and the set of lines connecting the passive station and the set of scatterers.

15 Claims, 2 Drawing Figures

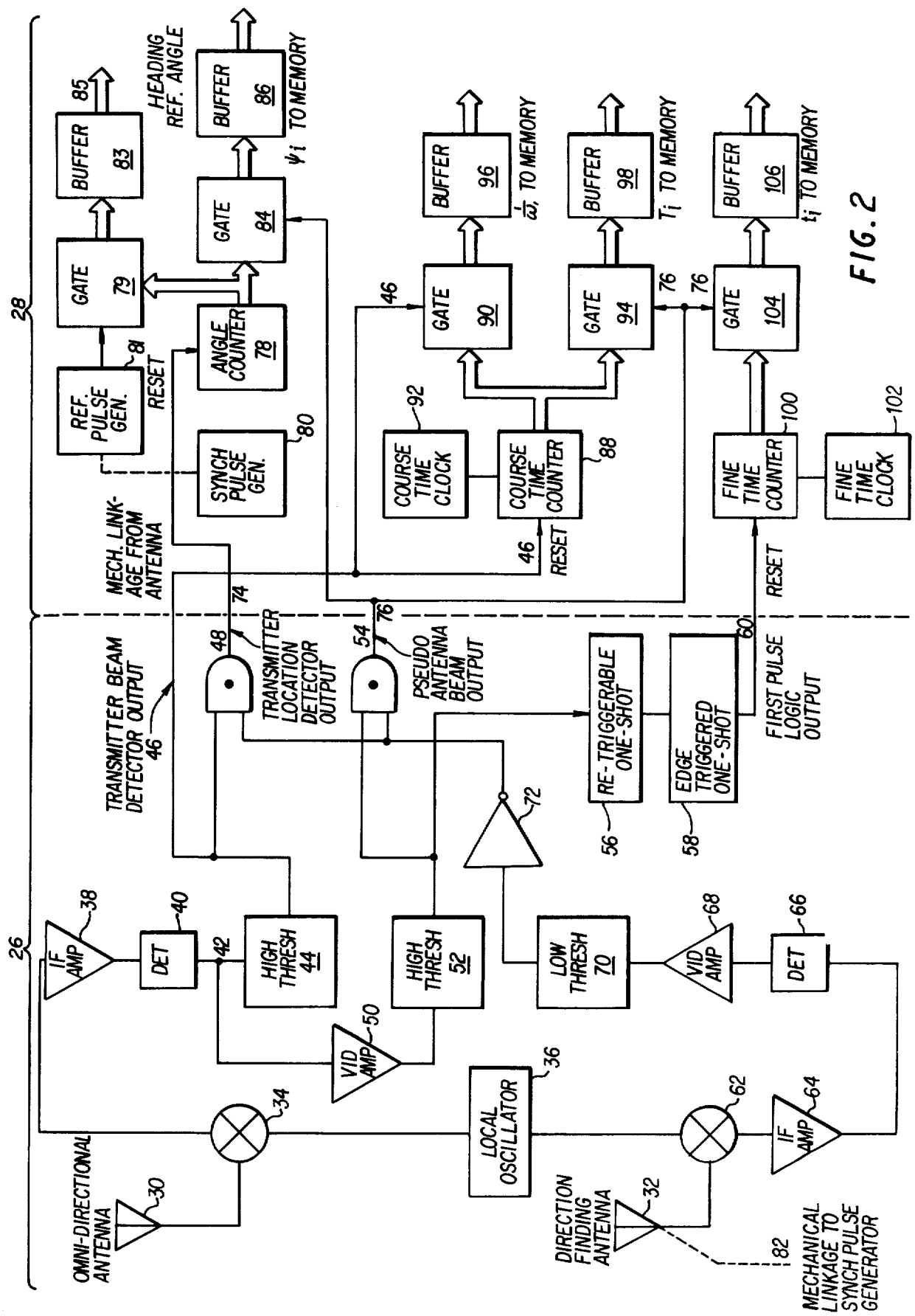

SELF-SURVEY MEANS

RIGHTS OF THE GOVERNMENT

The invention described herein may be manufactured, used or licensed by or for the Government of the United States of America for governmental purposes without payment to me of any royalties therefor.

BACKGROUND OF THE INVENTION

This invention relates to a method and apparatus for a passive station to locate itself relative to a pulsed transmitter that radiates a narrow scanning beam. Applications include radio navigation and homing using an existing radar transmitter or dedicated rotating beacons and self-location of receivers in a bistatic or multistatic radar system.

There are presently in existence various devices and methods for a station to locate itself. Some of these are well known, such as the ranging radar which is an active device in that is radiates a pulse and measures the time elapsed for a reflected signal to return from a known location. Using either bearing information or additional information from further known locations the station can locate itself relative to the object or objects. However, because this type of device is active, i.e., it radiates a signal, the device is relatively bulky, requires relatively high power for appreciable ranges and it can be detected and located by a remote station. Another device and method used for self-location is a direction finding antenna using crossed bearings from two or more known-location transmitting station. Where these two or more bearings cross is a measure of the location of the station. However, as indicated above, this method requires two or more transmitting stations.

These, and other known methods and devices have the disadvantage of either requiring bulky, expensive and relatively high power transmitting equipment or requiring two or more known-location transmitting stations. Additionally, an active station when transmitting a signal is susceptible of being located by other stations.

It is therefore one object of the present invention to provide a method for a station to locate itself that is completely passive.

It is another object of the present invention to provide a method for a station to locate itself that is simple, fast and accurate.

It is a further object of the present invention to provide a method for a station to locate itself relative to only one stationary or moving transmitting station.

It is still another object of the present invention to provide a device for a station to locate itself that is completely passive.

It is still a further object of the present invention to provide a device for a station to locate itself that is compact and inexpensive.

Other objects, advantages and novel features of the present invention will become apparent from the following detailed description of the invention when considered in conjunction with the accompanying drawings.

SUMMARY OF THE INVENTION

These and other objects, features and advantages of the present invention are accomplished by a method and device wherein a passive station can locate itself relative to a stationary or moving transmitting station transmitting a narrow pulsed scanning beam by utilizing reception of pulse directly from the transmitting station and reception of reflected pulses from one or more scatterers. The present invention utilizes a direction finding antenna to determine a bearing of the transmitting station from the passive station. A set of differential times, the times for a pulse from the transmitting station to travel to each scatterer and then to the passive station, is measured. A first set of angles lying between lines connecting the transmitting station and each scatterer and a line connecting the transmitting station and the passive station is determined. A second set of angles lying between a line connecting the transmitting station and the passive station and lines connecting the passive station and each scatterer, is determined. A set of ranges is calculated from the set comprising the differential times, the first set of angles and the second set of angles. The set of ranges may be averaged and a weighted mean calculated.

BRIEF DESCRIPTION OF THE DRAWINGS

The above and further objects and novel features of the present invention will more fully appear from the following description when the same is read in connection with the accompanying drawings. It is to be understood, however, that the drawings are for the purpose of illustration only, and are not intended as a definition of the limits of the invention.

FIG. 2 is a schematic diagram of an embodiment of the present invention.

DESCRIPTION OF THE PREFERRED EMBODIMENT

Figure 1:
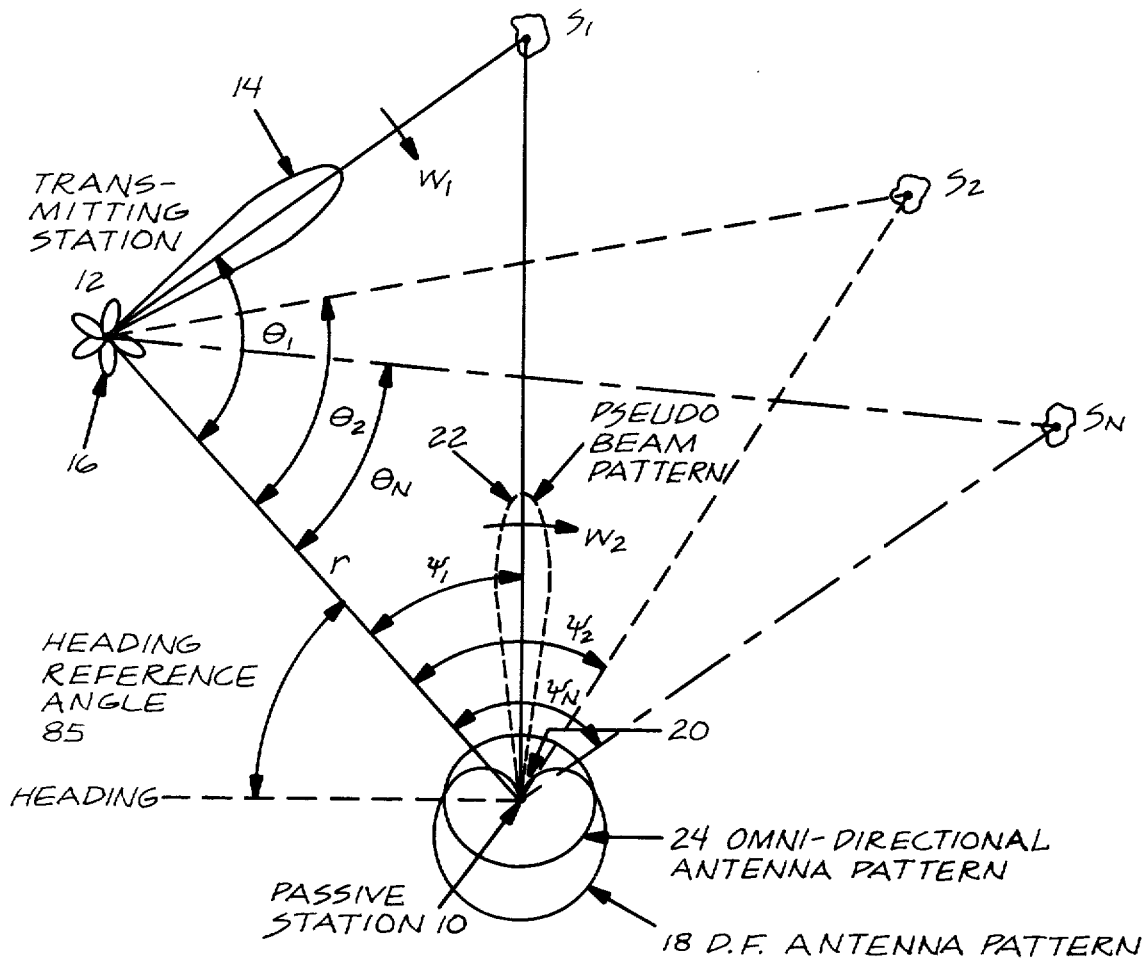
FIG. 1 illustrates the geometrical relationships utilized by the present invention.

Referring now to the drawings, FIG. 1 illustrates the geometrical relationships between the passive station 10, the transmitting station 12 and the scatterers, $S_1$, $S_2$ and $S_N$. It is to be understood that any number of scatterers can be utilized, the number being a compromise, i.e., the more scatterers, the more statistically accurate the calculated position, however, the total number would be limited by the ability of the system to process data rapidly. Therefore, the number of scatterers utilized is dependent upon the desired accuracy and the speed of the data processing system. Another factor that must be considered is that the transmitting station may also be moving as well as the passive station. This factor makes more critical the speed of the data processing.

The transmitting station 12 transmits a narrow pulsed scanning beam 14 rotating at a scanning rate $\omega_1$. As is well known in the antenna art there are sidelobes 16 associated with the production of a narrow antenna beam. Scatterers $S_1$ to $S_N$ are either existing structures or terrain that reflects radio signals or are reflectors placed at selected locations. Passive station 10 is provided with two antennas, direction finding (DF) antenna and an omni-directional antenna. The DF antenna has an antenna pattern 18 characterized by a null position 20. The DF antenna is rotated at a scanning rate $\omega_2$ which rotates the null position 20. The null position 20 is represented by a pseudo beam 22 which rotates at a scanning rate $\omega_2$. The omni-directional antenna has a circlar antenna pattern represented at 24. The angles, $\theta_i$, represented by $\theta_1$, $\theta_2$ and $\theta_N$ comprise a set of angles lying between a line connecting the transmitting station 12 with the passive station 10 and the set of lines connecting the transmitting station 12 with the set of scatterers, $S_i$, represented by $S_1$, $S_2$ and $S_N$. The set of angles, $\psi_i$, represented by $\psi_1$, $\psi_2$ and $\psi_N$ comprise a set of angles lying between a line connecting the passive station 10 with the transmitting station 12 and the set of lines connecting the passive station 10 with the set of scatterers $S_i$.

The passive station 10 locates itself relative to the transmitting station 12 by determining a bearing and a range from the transmitting station 12. Referring now to FIG. 2, a schematic diagram of an embodiment of the present invention, the method of determining the bearing and range will be described. It is to be understood that the embodiment shown in FIG. 2 is only one embodiment that can be used to perform the methods taught by this invention and that obvious modifications may be made by one skilled in the art to accomplish the same functions. FIG. 2 is divided into two parts with a receiver portion indicated generally at 26 and a measurement portion indicated generally at 28. The receiver portion 26 comprises generally two channels, one utilizing the signal received by the omni-directional antenna 30 and the other utilizing the signal received by the DF antenna 32. The signal received by the omni-directional antenna 30 is mixed by mixer 34 with a signal from local oscillator 36, fed through IF amplifier 38, detector 40 and divided into two signals at junction 42. One signal is fed through high threshold circuit 44 to a junction with a portion of the signal comprising a transmitter beam detector output signal 46 and the remaining portion fed to AND gate 48. The other portion of the signal at junction 42 is fed through a video amplifier 50, and then to high threshold circuit 52, the output of which is divided with one portion going to AND gate 54 and the other portion going to re-triggerable one-shot 56, then to edge-triggered one-shot 58 the output of which is the first pulse logic output signal 60.

The remaining channel of the receiver portion 26 utilizes the signal received by DF antenna 32 which is mixed by mixer 62 with a signal from local oscillator 36 fed through IF amplifier 64, detector 66, video amplifier 68, low threshold circuit 70, and inverter 72. The output of inverter 72 is fed to AND gate 48 with the output of high threshold circuit 44 as described above. The output of AND gate 48 is the transmitter location detector output signal 74. The output of inverter 72 is also fed to AND gate 54 with the output of high threshold circuit 52 as described above. The output of AND gate 54 is the pseudo antenna beam output signal 76.

The measurement portion 28 utilizes the output signals 46, 60, 74, 76 from the receiver portion 26 to determine the set $\psi_i$, a set of coarse times $T_i$ in which each member is an elapsed time between reception of a reflected pulse from member of the set of scatterers $S_i$ and passage of the transmitter beam across the passive station, a set of differential times $t_i$ in which each member is a difference in time between reception of a pulse directly from the transmitting station and reception of the same pulse via reflection from a member of the set of scatterers $S_i$, and the value $1/\psi_1$. These sets $\psi_i$, $T_i$ and $t_i$ and the value $1/\psi_1$ are used to calculate the bearing and range of the passive station 10 from the transmitting station 12. FIG. 2 shows the sets $\psi_i$, $T_i$ and $t_i$ and the value $1/\psi_1$ going to memory which may be the memory of a microprocessor (not shown) programmed to calculate and display the bearing and range. The utilization of a calculating means such as a microprocessor or computer is well within the state of the art and is not described as the program, the mathematical formula or algorithm is not claimed as a part of this invention. The present invention teaches only a new and novel method and device for determining the values used in the algorithm.

The measurement portion 28 comprises basically four channels which utilize the outputs of the receiver portion 26 to measure the three sets $\psi_i$, $T_i$ and $t_i$ and the value $1/\psi_1$. The transmitter location detector output signal 74 resets angle counter 78 which is diven by synchronization pulse generator 80 which in turn is driven by mechanical linkage 82 from the DF antenna 32. Pseudo antenna beam output signal 76 gates the output of angle counter 78 through gate 84 to buffer 86 which prepares the $\psi_i$ for entry into an appropriate memory for processing. The output of angle counter 78 is also gated through gate 79 with an input from reference pulse generator 81 which is driven by mechanical linkage 84 from the DF antenna 32. The output of gate 79 is fed to buffer 83 which prepares the heading reference angle 85 for entry into an appropriate memory for processing. The transmitter beam detector output 46 is used to reset course time counter 88 and as an input to gate 90. The course time counter 88 is driven by course time clock 92. The output of course time counter 88 is fed to gates 90 and 94. The output of gate 90 is fed to buffer 96 which prepares the value $1/\psi_1$ for entry into an appropriate memory for processing. Gate 94, with an input of pseudo antenna beam output signal 76 outputs a signal to buffer 98 which prepares the set $T_i$ for entry into an appropriate memory for processing. The first pulse logic output signal 60 resets fine time counter 100 which is driven by fine time clock 102. The output of fine time counter 100 is gated by gate 104 with an input of pseudo antenna beam output signal 76 to buffer 107 which prepares the set $t_i$ for entry into an appropriate memory for processing.

The operation of the system illustrated in FIG. 2 will now be described in conjunction with FIG. 1. The transmitter location detector output signal 74 is present when the transmitter beam 14 is pointing towards the passive station 10 and the DF antenna null 20 is pointed towards the transmitter. This condition is detected by omni-directional antenna 30 and the DF antenna 32 and the associated circuitry. AND gate 48 will output only when these two conditions are met, i.e., when there is a large signal received by the omni-directional antenna 30 and a little or no signal received by the DF antenna 32. It is noted that it may be necessary to have an additional low gain DF channel, since scatterers near the transmitter may cause some signals of sufficient strength to always be seen by the DF antenna 32. This situation may also be alleviated by reducing the sensitivity in the DF channel. The correspondence of the transmitter beam and the null position pointing in the correct direction is accomplished by having the passive station DF antenna scanning at a much slower rate than the transmitter beam and by the fact that the transmitter beam and passive station DF antenna null each have a finite width. This insures that there will be a time when the passive station 10 will be within the beam width of the transmitter beam 14, and the DF null 20 will be pointing toward the transmitting station 12. The transmitter location detector output signal 74 is used to reset angle counter 78 which is driven by synch pulse generator 80 which is in turn driven by mechanical linkage 82 from DF antenna 32. The output of angle counter 78 is utilized in two ways. The output of angle counter 78 is fed to gate 84 and to gate 79.

The output of angle counter 78 fed to gate 84 is utilized to determine the set of angles $\psi_i$ with an input of the pseudo antenna beam output signal 76 to gate 84. The pseudo antenna beam output signal 76 is derived from AND gate 54 which requires that a signal be present at the omni-directional antenna 30 and output from high threshold circuit 52 and that there be no signal at the DF antenna, i.e., the pseudo beam 22 (the null 20) be pointed at a scatterer, $S_i$. This situation is illustrated in FIG. 1 wherein the pseudo beam 22 is pointed towards scatterer $S_1$. As can be appreciated the output of gate 84 will be a measure of angle $\psi_i$, FIG. 1 in that signal 74 reset angle counter 78 and signal 76 causes the value counted (which is proportional to angle $\psi$) to be input to buffer 86 for entry to memory as described above.

As noted above the output of angle counter 78 is also input to gate 79. Gate 79, reference pulse generator 81 driven by mechanical linkage 82 and buffer 83 determine the relative angle, i.e., the bearing of the transmitting station 12 from some reference on the passive station 10. For example, the reference may be the heading or the way the passive station is pointing. If the passive station is a vehicle, such as a tank, the bearing of the transmitting station could be indicated as, for example, $\chi$ degrees from straight ahead. The reference pulse generator 81 would provide an input to gate 79, when, for example, the DF antenna passed the heading position of the vehicle, and the angle counter 78 would provide an input to gate 79 proportional to the bearing of the transmitting station 12 from the passive station 10.

The transmitter beam detector output signal 46 is present whenever the transmitter beam 14 sweeps by the passive station 10. This strong signal is received by the omni-directional antenna 30 and output from the high threshold circuit 44. This output is input to gate 90 and to course time counter 88 where it is used as a reset signal. The high threshold circuit 44 insures that an output is generated only when a high amplitude signal is present. The transmitter beam detector output signal 46 resets course time counter 88 and simultaneously gates any value in gate 90 to buffer 96. On the next sweep of the transmitter beam 14 past the passive station 12 the value gated to buffer 96 will be the time between successive sweeps of the transmitter beam 14 and thus a measure of the scanning rate of the transmitter beam 14. This time, which is proportional to $1/\omega_1$ is entered into memory for further processing.

The course time counter 88, which is reset by transmitter beam detector output 46 as described above, also outputs to gate 94 and is gated to buffer 98 by the pseudo antenna beam output signal 76. This time is the coarse time, $T_i$, which is the time elapsed between reception of echos received from a scatterer, $S_i$, and passage of the transmitter beam 14 across the passive station 10. Each value T of the set $T_i$ is entered by buffer 98 to memory for further processing.

The first pulse logic output signal 60 is generated by the first pulse received, from any direction, each interpulse period. Such logic is possible because there is considerable dead time between the last echo detectable and the next transmitter pulse. Each pulse received by the omni-directional antenna 30 which is strong enough to pass through the high threshold circuit 52 triggers or retriggers the retriggerable one-shot 56. The period of the one-shot 56 is set to be slightly less than one-half of the transmitter interpulse period. Because of the high threshold circuit 52 the one-shot 56 is always triggered by the direct-path signal from the transmitting station 12. Its period may be extended by various amounts by echo signals. After the one-shot pulse is over, it will be too late for additional echos to be seen. Thus, the one-shot 56 will wait in the "off" condition until the next direct-path signal arrives from the transmitting station. Each time the one-shot 56 turns "on" it triggers edge-triggered one-shot 58 which outputs a short pulse, indicating arrival of the "first" or direct path signal. This first pulse logic output signal 60 is used to reset a fine-time counter 100 which is driven by fine-time clock 102. The fine-time counter 100 value is gated by gate 104 with an input of the pseudo antenna beam output signal 76 to buffer 106 for entry to memory for further processing of a value t which is one value of the set $t_i$. The set $t_i$, termed the differential time is the difference in time measured between reception of a pulse directly from the transmitting station 12 and reception of that pulse via reflection from a member of the set of scatterers $S_i$.

How the values described above are utilized to determine the range and bearing of the transmitting station 12 from the passive station 10 will now be described in conjunction with FIG. 1. As described above the heading reference angle 85 is an angle relative to a selected reference on the passive station 10. Referring to FIG. 1 the heading or the way the passive station is pointing may be chosen as the reference. Then the heading reference angle 85 is the angle from this reference to the line connecting the transmitting station 12 with the passive station 10. This determines the bearing of the transmitting station 12 from the passive station 10.

The sets $\psi_i$, $T_i$ and $t_i$ plus the value $1/\omega_1$ are used to calculate the range of the transmitting station 12 from the passive station 10. The range, r, is computed using the following equation, which is derived from the geometry of FIG. 1 using the law of sines:

$$r = \frac{ct \sin(\theta + \psi)}{\sin \theta + \sin \psi - \sin(\theta + \psi)} \quad (1)$$

where c = speed of light. As can be appreciated, there is calculated a value of r for each set of values $t_i$, $\psi_i$ and $\theta_i$. Theoretically, the value of r would be equal for each set of values, however, because of measurement error, etc., a set of ranges, $r_i$, will be calculated. As described below, the set, $r_i$, can be averaged or a weight can be assigned to each r of the set $r_i$.

Calculation of each of the values required for equation (1) will now be explained. The set, $\theta_i$, as described above is the set of angles, $\theta_i$, lying between a line connecting the transmitting station 12 with the passive station 10 and the set of lines connecting the transmitting station 12 with the set of scatterers, $S_i$. The set $\theta_i$ is calculated from the transmitting antenna scan rate $\omega_1$ and the set of course times $T_i$, i.e., $\theta_i = \omega_1 T_i$. Thus, the values $1/\omega_1$ and $T_i$ input into memory are used to calculate, $\theta_i$.

The remaining values, i.e., the sets $\psi_i$ and $t_i$ were entered into memory as described above. The calculation of Equation (1) can be accomplished by a microprocessor as described above. The ability of a microprocessor to rapidly process and display the calculated values of the bearing and range allows a passive station to rapidly and accurately update its location.

As noted above, the set of ranges, $r_i$, obtained may be simply averaged, by the microprocessor, or a weighted average may be calculated by assigning a weight to each member to the set $r_i$. The weighted average can be calculated by considering the errors arising from measurement errors in determining $\theta_i$, $\psi_i$ and $t_i$ and $\omega_1$. The measurement errors in these values are dependent upon the scatterer location, relative to the transmitter station and passive station, as can be determined by taking the partial derivatives of Equation (1) with respect to r. For example, a scatterer location in the region lying between the transmitter and passive station gives rise to large errors and data from scatterers located on this region should be deleted when computing an average value of r. With reasonable parameters, such as good scatterer locations and small measurement errors, r can be determined with a relatively small error. For example, with $\theta = \psi = 60°$, and with rms angular errors of 1 degree and an rms temporal error of 1% of the differential range time t, the rms error in r is on the order of 4% of r. A preferred method of averaging the computed values of r is to apply weights to the values of r which are inversely proportional to the error variance predicted by the scatterer location, as determined by the calculated values of $\theta$ and $\psi$. This variance is the sum of the error variances contributed by each measured quantity:

$$\sigma^2(r) = \left(\frac{\partial r}{\partial t}\right)^2 \sigma^2(t) + \left(\frac{\partial r}{\partial \theta}\right)^2 \sigma^2(\theta) + \left(\frac{\partial r}{\partial \psi}\right)^2 \sigma^2(\psi)$$

The variance $\sigma^2(t)$, $\sigma^2(\theta)$ and $\sigma^2(\psi)$ are predicted performance characteristics of the equipment, and to the first approximation they may be considered constants. The partial derivatives are evaluated for each scatterer location. The weighted average of the various computed values $r_i$ is then:

$$\bar{r} = \left[\sum_{i=1}^{n} \omega_i r_i\right] \div \left[\sum_{i=1}^{n} \omega_i\right]$$

where $\omega_i = 1/\sigma^2(r)$ and the variance is computed for the location of the scatterer which gave rise to the data resulting in $r_i$.

While the invention has been described with reference to the accompanying drawings, it is to be clearly understood that the invention is not to be limited to the particular details shown therein as obvius modifications may be made by those skilled in the art. Thus, the scope of the invention should only be limited by the following claims.

What I claim is:

1. A method for a passive station to locate itself relative to a transmitting station transmitting a narrow pulsed scanning beam by utilizing reception of pulses directly from the transmitting station and reception of reflected pulses from a set of scatterers $S_i$, comprising the steps of:

determining a bearing of said transmitting station from said passive station by rotating a direction finding antenna in azimuth until a first null position is indicated by said direction finding antenna;

measuring a set of differential times $t_i$, each member of said set of differential times being the difference in time measured between reception of a pulse directly from said transmitting station and reception of said pulse via reflection from a member of said set of scatterers;

determining a set of angles $\theta_i$, said set of angles lying between a line connecting said transmitting station and said passive station and the set of lines connecting said transmitting station with said set of scatterers;

determining a set of angles $\psi_i$, said set of angles, $\psi_i$, lying between a line connecting said passive station and said transmitting station and the set of lines connecting said passive station and said set of scatterers; and calculating a set of ranges $r_i$, utilizing said sets of differential times $t_i$, said angles $\theta_i$, and said angles $\psi_i$, by calculating a first set of values, $\nu_i$, each member of said first set of values obtained by multiplying the speed of light, the corresponding member of said set of differential times, $t_i$, and the sine of the sum of the corresponding member of said set of angles, $\theta_i$, and the corresponding member of said set of angles, $\psi_i$, calculating a second set of values, $\chi_i$, each member of said second set of values obtained by summing the sine of the corresponding member of said set of angles, $\theta_i$, and the same of the corresponding member of said set of angles, $\chi_i$, and subtracting the sine of the sum of the corresponding members of said sets of angles, $\theta_i$ and $\psi_i$, and calculating said set of ranges, $r_i$, by dividing the corresponding members of said first set of values, $\nu_i$, by the corresponding members of said second set of values, $\chi_i$.

2. A method, as recited in claim 1, wherein the step of measuring a set of differential times, $t_i$, is accomplished by:

observing a first time of reception at said passive station of a pulse directly from said transmitting station;

observing a second time of reception at said passive station of said pulse after being reflected from a member of said set of scatterers, $S_i$; and calculating each member of said set of differential times by comparing said second time with said first time observed for each member of said set of scatterers.

3. A method, as recited in claim 2, wherein the step of determining a set of angles, $\theta_i$, is accomplished by:

determining a scanning rate, $\omega_1$, of said transmitting station;

determining a set of coarse times, $T_i$, each member of said set of coarse times being the elapsed time between reception of said reflected pulse from a member of said set of scatterers and passage of said scanning beam across said passive station; and calculating each member of said set of angles, $\theta_i$, by multiplying each member of said set $T_i$ by said scanning rate $\omega_1$.

4. A method, as recited in claim 3, wherein the step of determining a set of angles, $\psi_i$, is accomplished by:

rotating said direction finding antenna in azimuth and recording positions of second and subsequent null positions, each of said second and subsequent null positions indicating the direction of each member of said scatterers from said passive station; and determining said set of angles, $\psi_i$, by comparing each of said second and subsequent null positions with said first null position.

5. A method, as recited in claim 1, further comprising the step of averaging said set of ranges.

6. A method, as recited in claim 5, further comprising the step of applying a weighted value to each member of said set of ranges.

7. An apparatus for enabling a passive station to locate itself relative to a transmitting station transmitting a narrow pulsed scanning beam which utilizes reception of pulses directly from the transmitting station and reception of reflected pulses from a set of scatterers $S_i$, comprising:

means for receiving said pulses, including a rotating direction finding antenna with a null position and an omni-directional antenna;

means for determining a bearing of said transmitting station from said passive station;

means for measuring a set of differential times, $t_i$, each member of said set of differential times being the difference in time measured between reception of a pulse directly from said transmitting station and reception of said pulse via reflection from a member of said set of scatterers;

means for determining a set of angles,, $\theta_i$, said set of angles lying between a line connecting said transmitting station and said passive station and the set of lines connecting said transmitting station with said set of scatterers;

means for determining a set of angles, $\psi_i$, said set of angles lying between a line connecting said passive station and said transmitting station and a set of lines connecting said passive station and said set of scatterers; and means for calculating a set of ranges $r_i$, utilizing said set of differential times $t_i$, said set of angles $\theta_i$, and said set of angles $\psi_i$, comprising means for calculating a first set of values $v_i$, each member of said first set of values obtained by multiplying the speed of light, the corresponding member of said set of differential times, $t_i$, and the sine of the sum of the corresponding member of said set of angles, $\theta_i$, and the corresponding member of said set of angles, $\psi_i$, means for calculating a second set of values, $\chi_i$, each member of said second set of values obtained by summing the sine of the corresponding member of said set of angles, $\theta_i$, and the sine of the corresponding member of said set of angles, $\psi_i$, and subtracting the sine of the sum of the corresponding members of said sets of angles, $\theta_i$ and $\psi_i$, and calculating said set of ranges, $r_i$, by dividing the corresponding members of said first set of values, $v_i$, by the corresponding members of said second set of values, $\chi_i$.

8. An apparatus, as recited in claim 7, wherein said means for determining a bearing of said transmitting station from said passive station comprises means for determining when said null position is pointed towards said transmitting station.

9. An apparatus, as recited in claim 8, wherein said means for measuring a set of differential times, $t_i$, comprises:

means for determining a first time of reception at said passive station of a pulse directly from said transmitting station;

means for determining a second time of reception at said passive station of said pulse after being reflected from a member of said set of scatterers; and means for calculating said differential times, $t_i$, by comparing said second time with said first time for each member of said set of scatterers.

10. An apparatus, as recited in claim 9, wherein said means for determining a set of angles, $\theta_i$, comprises:

means for determining a scanning rate, $\omega_1$, of said transmitting station;

means for determining a set of coarse times, $T_i$, each member of said set of coarse times being the elapsed time between reception of said reflected pulse from a member of said set of scatterers and passage of said scanning beam across said passive station; and means for calculating each member of said set of angles, $\theta_i$, by multiplying each member of said set of coarse times, $T_i$, by said scanning rate $\omega_1$.

11. An apparatus, as recited in claim 10, wherein said means for determining a set of angles, $\psi_i$, comprises:

means for determining second and subsequent null positions of said direction finding antenna wherein said second and subsequent null positions each indicate a direction to a member of said set of scatterers; and means for calculating said set of angles, $\psi_i$, by comparing each of said second and subsequent null positions with said first null position.

12. An apparatus, as recited in claim 7, further comprising means for averaging said set of ranges.

13. An apparatus, as recited in claim 12, further comprising means for applying a weighted value to each member of said set of ranges.

14. A method for a passive station to locate itself relative to a transmitting station transmitting a narrow pulsed scanning beam, comprising;

receiving pulses transmitted from the transmitting station to an omni-directional antenna at the passive station;

determining which of said received pulses are direct pulses transmitted directly from the transmitting station to the passive station and which are reflected pulses reflected from a set of scatterers $S_i$;

determining the direction of said transmitting station and said set of scatterers from said passive station by rotating a direction finding antenna in azimuth;

measuring a set of differential times $t_i$, each member of said set of differential times being the difference in time measured between reception of a pulse directly from said transmitting station and reception of said pulse via reflection from a member of said set of scatterers;

determining a set of angles, $\theta_i$, said set of angles lying between a line connecting said transmitting station and said passive station and the set of lines connecting said transmitting station with said set of scatterers;

determining a set of angles $\psi_i$, said set of angles, $\psi_i$, lying between a line connecting said passive station and said transmitting station and the set of lines connecting said passive station and said set of scatterers; and calculating a set of ranges, $r_i$, utilizing said sets of differential times, $t_i$, said angles, $\theta_i$, and said angles, $\psi_i$.

15. An apparatus for enabling a passive station to locate itself relative to a transmitting station transmitting a narrow pulsed scanning beam, comprising:
- omni-directional antenna means for receiving pulses transmitted from the transmitting station to the passive station;
- threshold means for determining which of said received pulses are direct pulses transmitted directly from the transmitting station to the passive station and which are reflected pulses reflected from a set of scatterers $S_i$;
- means for determining the direction of said transmitting station and said set of scatterers $S_i$ from said passive station, including a rotating direction finding antenna means;
- means for measuring a set of differential times $t_i$, each member of said set of differential times being the difference in time measured between reception of a pulse directly from said transmitting station and reception of said pulse via reflection from a member of said set of scatterers;
- means for determining a set of angles, $\theta_i$, said set of angles lying between a line connecting said transmitting station and said passive station and the set of lines connecting said transmitting station with said set of scatterers;
- means for determining a set of angles, $\psi_i$, said set of angles lying between a line connecting said passive station and said transmitting station and the set of lines connecting said passive station and said set of scatterers; and
- means for calculating a set of ranges, $r_i$, utilizing said set of differential times, $t_i$, said set of angles, $\theta_i$, and said set of angles, $\psi_i$.

* * * * *